United States Patent
Huang et al.

(10) Patent No.: US 7,809,474 B2
(45) Date of Patent: Oct. 5, 2010

(54) PROTECTION GAS CONTROL METHOD FOR NON-SEALED PROCESS CHAMBER

(75) Inventors: Chun-Hung Huang, Hsinchu County (TW); Ming-Lang Chang, Hsinchu County (TW); Yen-Chia Peng, Tainan (TW); Tsang-Fang Jeng, Hsinchu (TW); Tzu-Hsin Kuo, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 242 days.

(21) Appl. No.: 12/165,792

(22) Filed: Jul. 1, 2008

(65) Prior Publication Data

US 2009/0182457 A1    Jul. 16, 2009

(30) Foreign Application Priority Data

Jan. 15, 2008    (TW)    ............... 97101438 A

(51) Int. Cl.
*G05D 7/00*    (2006.01)
*G06F 19/00*    (2006.01)

(52) U.S. Cl. ...................................... 700/282; 700/204

(58) Field of Classification Search ................. 700/204, 700/282
See application file for complete search history.

(56) References Cited

U.S. PATENT DOCUMENTS 5,158,746 A * 10/1992 Suzuki et al. ................. 422/52
5,385,462 A * 1/1995 Kodama et al. ............. 425/135
5,586,587 A * 12/1996 Leininger et al. ........... 141/196

* cited by examiner

*Primary Examiner*—Ryan A Jarrett
(74) *Attorney, Agent, or Firm*—WPAT, PC; Justin King

(57) ABSTRACT

A protection gas control method for a non-sealed process chamber including the steps of activating a protection gas control apparatus while coupling a protection gas to a plurality of throttle valves, opening all the throttle valves for a pre-determined period of time, closing at least one of the throttle valves if the oxygen concentration in the chamber is smaller than or equal to a first target value, determining whether the oxygen concentration in the chamber is smaller than or equal to a second target value, and stopping supplying the protection gas when the temperature of the chamber is lower than a pre-determined temperature.

6 Claims, 3 Drawing Sheets

PROTECTION GAS CONTROL METHOD FOR NON-SEALED PROCESS CHAMBER

BACKGROUND OF THE INVENTION

1. Field of the Invention

The present invention generally relates to a protection gas control method and a protection gas control apparatus for a non-sealed process chamber and, more particularly, to a protection gas control method and a protection gas control apparatus using a gas supply device used for controlling a non-sealed process chamber to prolong the lifetime of the molds and improve the manufacturing yield with lowered protection gas consumption and lowered operation cost.

2. Description of the Prior Art

The chamber for some high-temperature molding apparatuses such as glass molding processing apparatuses provides a plurality of holes to dispose cooling pipelines, electrical pipelines, cylinders and sensors for operations on an open conveyor belt. The chamber is non-sealed and the protection gas therein may leak. Therefore, the protection gas has to be supplied at anytime; otherwise, the molds and the manufactured products may be oxidized to shorten the lifetime of the molds and lower the manufacturing yield when the protection gas concentration is too low (relative to the protection gas concentration in the air). On the contrary, if the protection gas is over-supplied, the manufacturing cost is increased due to protection gas leakage even though the molds and the manufactured products can be prevented from being oxidized.

Therefore, there is need in providing a protection gas control method and a protection gas control apparatus for a non-sealed process chamber.

SUMMARY OF THE INVENTION

The present invention provides a protection gas control method and a protection gas control apparatus for a non-sealed process chamber using a gas supply device used for controlling a non-sealed process chamber to prolong the lifetime of the molds and improve the manufacturing yield with lowered protection gas consumption and lowered operation cost.

The present invention provides a protection gas control method for a non-sealed process chamber, comprising steps of:

(A) activating a protection gas control apparatus while coupling a protection gas to a plurality of throttle valves;

(B) defining an opening time for each of the throttle valves;

(C) setting up a first target value and a second target value related to the oxygen concentration in the non-sealed process chamber;

(D) heating up the non-sealed process chamber;

(E) determining whether a processing apparatus is in operation and performing step (F) if the processing apparatus is in operation, and otherwise performing step (M);

(F) determining whether an inlet/outlet for the non-sealed process chamber is opened and performing step (G) if the inlet/outlet for the non-sealed process chamber is opened, and otherwise performing step (H);

(G) opening all the throttle valves for a pre-determined period of time and performing step (E);

(H) closing at least one of the throttle valves;

(I) determining whether the oxygen concentration in the non-sealed process chamber is smaller than or equal to the first target value, and performing step (J) if the oxygen concentration in the non-sealed process chamber is smaller than or equal to the first target value, and otherwise performing step (E);

(J) determining whether the oxygen concentration in the non-sealed process chamber is smaller than or equal to the second target value, and performing step (K) if the oxygen concentration in the non-sealed process chamber is smaller than or equal to the second target value, and otherwise performing step (L);

(K) closing at least one of the throttle valves and performing step (E);

(L) keeping the number of throttle valves that are opened and performing step (E); and (M) stopping supplying the protection gas when the temperature of the non-sealed process chamber is lower than a pre-determined temperature.

The present invention further provides a protection gas control apparatus for a non-sealed process chamber, comprising:

a protection gas supply device, comprising a plurality of throttle valves capable of controlling the flow of a protection gas;

a plurality of solenoid valves capable of controlling on/off operations of the throttle valves;

an oxygen sensor capable of detecting and outputting the oxygen concentration in the non-sealed process chamber; and a control circuit capable of receiving an output value from the oxygen sensor so as to control on/off operations of the solenoid valves using the output value processed by the control circuit.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified but not limited by the preferred embodiment as described hereinafter.

Figure 1:
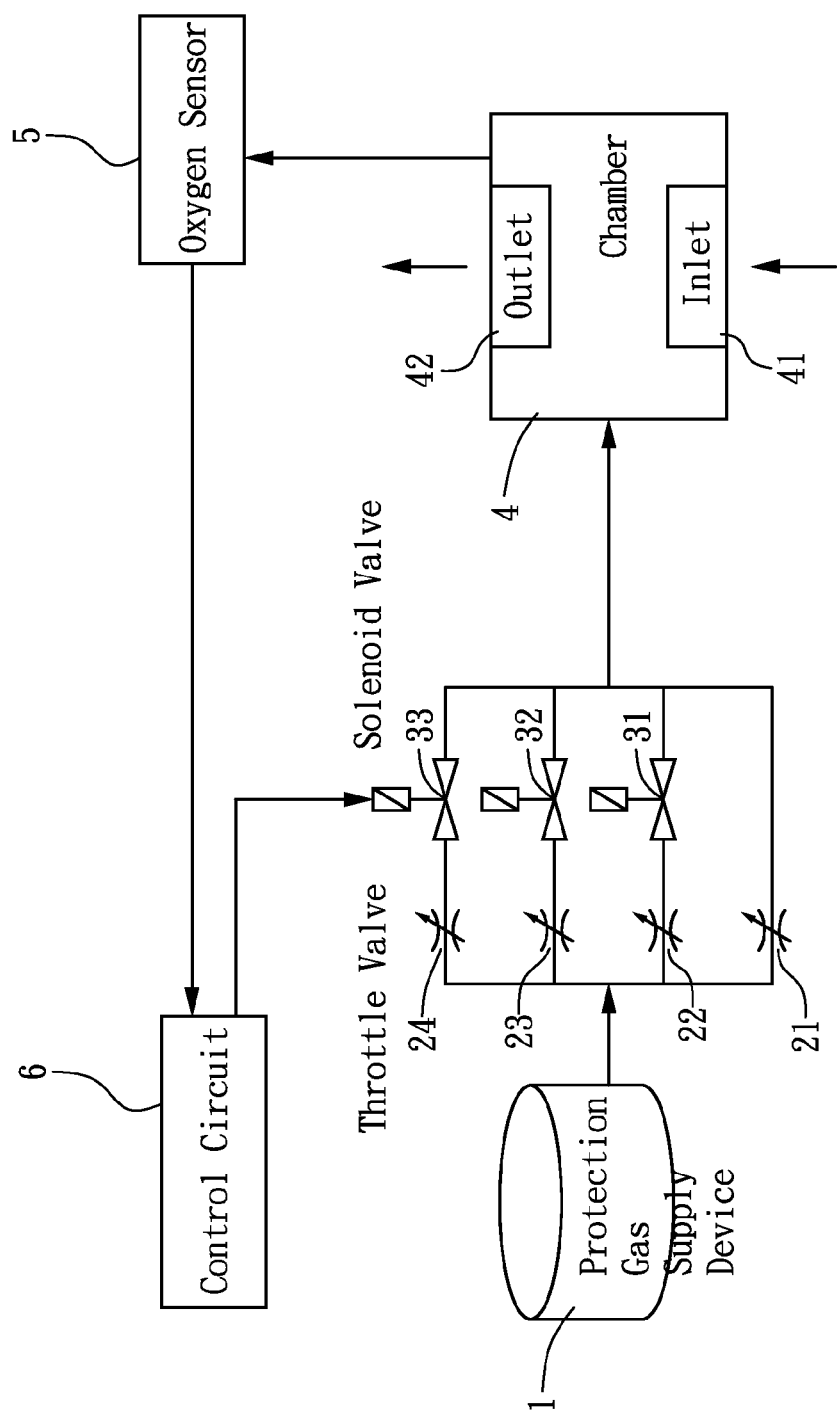
FIG. 1 is a functional block diagram of a protection gas control apparatus for a non-sealed process chamber according to the present invention.

Please refer to FIG. 1, which is a functional block diagram of a protection gas control apparatus for a non-sealed process chamber according to the present invention. The protection gas control apparatus comprises: a protection gas supply device 1, a plurality of solenoid valves, an oxygen ($O_2$) sensor 5 and a control circuit 6. The protection gas supply device 1 can be a nitrogen cylinder or a nitrogen generator, which comprises a plurality of throttle valves capable of controlling the flow of a protection gas. The protection gas is nitrogen. The plurality of solenoid valves are capable of controlling on/off operations of the throttle valves. In the present embodiment, three solenoid valves are provided. More particularly, the first solenoid valve 31, the second solenoid valve 32 and the third solenoid valve 33 are used to control three throttle valves, namely, the second throttle valve 22, the third throttle valve 23 and the fourth throttle valve 24. Moreover, the first throttle valve 21 is not controlled by any solenoid valve. In other words, the first throttle valve 21 is normally open to provide the chamber 4 with protection gas at anytime with a minimum flow. If a maximum flow of the protection gas is required, only three solenoid valves (the first solenoid valve 31, the second solenoid valve 32 and the third solenoid valve 33) are simultaneously opened. Meanwhile, four throttle valves (the first throttle valve 21, the second throttle valve 22, the third throttle valve 23 and the fourth throttle valve 24) are opened to achieve a maximum flow. Other flow amounts (from the minimum flow to the maximum flow) can be determined according to the number of solenoid valves remained open. The oxygen sensor 5 is capable of detecting and outputting the oxygen concentration in the non-sealed process chamber. The control circuit 6 is capable of receiving an output value from the oxygen sensor 5 so as to control on/off operations of the solenoid valves using the output value processed by the control circuit.

In the present invention, the chamber 4 comprises an inlet 41 and an outlet 42. The on/off operations of the inlet 41 and the outlet 42 correspond to the operations on an open conveyor belt. The inlet 41 and the outlet 42 are turned on/off simultaneously so that the un-molded half-finished products can be delivered into the chamber 4 and the molded products can be delivered from the chamber 4.

Figure 2:
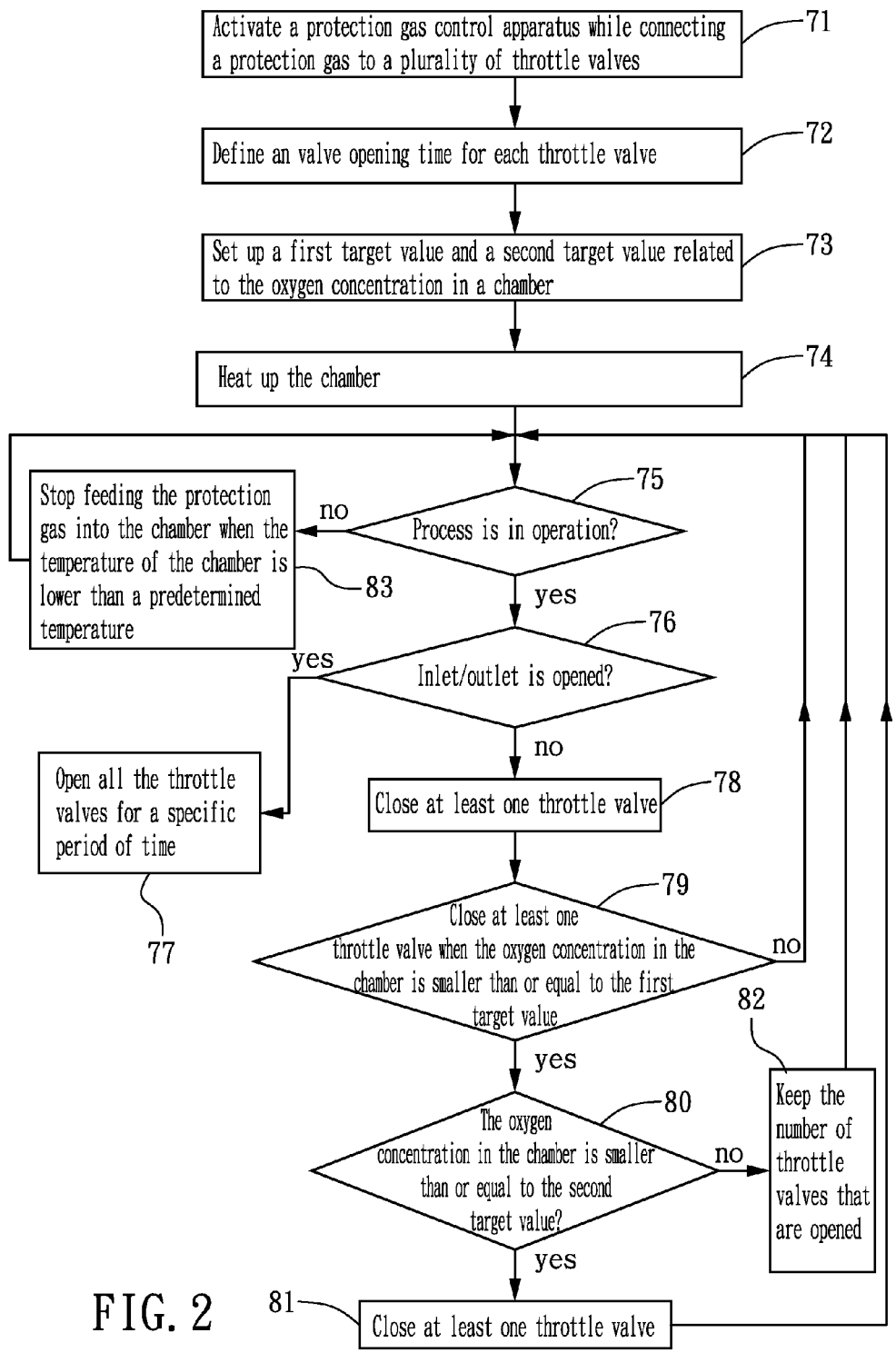
FIG. 2 is a flowchart of a protection gas control method for a non-sealed process chamber according to the present invention.

Please refer to FIG. 2, which is a flowchart of a protection gas control method for a non-sealed process chamber according to the present invention. The protection gas control method comprises steps described hereinafter:

In Step (71), a protection gas control apparatus is activated while a protection gas is coupled to a plurality of throttle valves. In the present embodiment, the protection gas is nitrogen.

In Step (72), an opening time for each of the throttle valves is defined. The plurality of throttle valves are turned on/off corresponding to a plurality of solenoid valves controlled by a controller.

In Step (73), a first target value and a second target value related to the oxygen concentration in the non-sealed process chamber are set up. The second target value is smaller than the first target value.

In Step (74), the non-sealed process chamber is heated up.

In Step (75), whether a processing apparatus is in operation is determined. In the present embodiment, the processing apparatus is a high-temperature molding apparatus. Step (76) is then performed if the processing apparatus is in operation, and otherwise, Step (83) is performed.

In Step (76), whether an inlet/outlet for the non-sealed process chamber is opened is determined. Step (77) is performed if the inlet/outlet for the non-sealed process chamber is opened, and otherwise, Step (78) is performed.

In Step (77), all the throttle valves are opened for a pre-determined period of time and Step (75) is performed.

In Step (78), at least one of the throttle valves is closed.

In Step (79), whether the oxygen concentration in the non-sealed process chamber is smaller than or equal to the first target value is determined. Step (80) is performed if the oxygen concentration in the non-sealed process chamber is smaller than or equal to the first target value, and otherwise, Step (75) is performed.

In Step (80), whether the oxygen concentration in the non-sealed process chamber is smaller than or equal to the second target value is determined. Step (81) is performed if the oxygen concentration in the non-sealed process chamber is smaller than or equal to the second target value, and otherwise, Step (82) is performed.

In Step (81), at least one of the throttle valves is closed and Step (75) is performed.

In Step (82), the number of throttle valves that are opened is kept and Step (75) is performed.

In Step (83), the supply of the protection gas is stopped when the temperature of the non-sealed process chamber is lower than a pre-determined temperature. The pre-determined temperature is 80° C.

Figure 3:
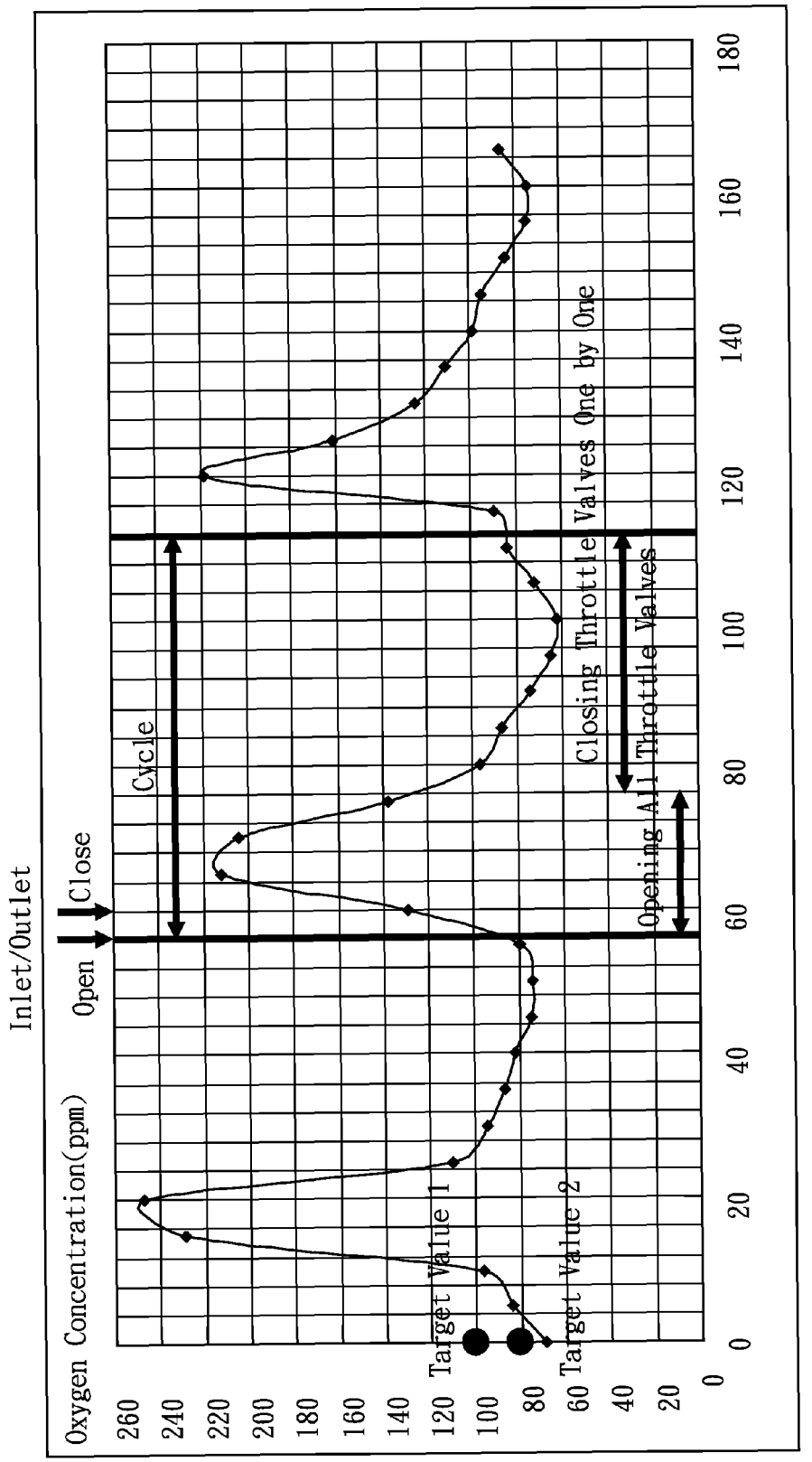
FIG. 3 is a graph showing the oxygen concentration in a non-sealed process chamber according to the present invention.

Please refer to FIG. 3, which is a graph showing the oxygen concentration in a non-sealed process chamber according to the present invention. The longitudinal coordinate (Y-axis) represents the oxygen concentration in the non-sealed process chamber, and the transversal coordinate (X-axis) represents the operation time. In FIG. 3, the chamber oxygen concentration changes periodically. In a certain cycle, before the throttle valves are opened, the oxygen concentration in the chamber reaches a pre-determined high concentration because the inlet and the outlet are turned on/off simultaneously so that the external gas flows in the chamber. Meanwhile, all the throttle valves have to be opened so that the oxygen concentration drops sharply. After a very short period of time, the oxygen sensor detects the fall of the oxygen concentration to turn off the throttle valves one by one to lower the protection gas (nitrogen) consumption. In this manner, the manufacturing cost is reduced since the protection gas is no longer over supplied as compared to the prior art.

From FIG. 1 to FIG. 3, a feedback signal generated by the oxygen sensor after the oxygen concentration in the chamber is detected is received and processed by the control circuit so as to control the supply of the protection gas by controlling the on/off operations of the solenoid valves and throttle valves. In the present embodiment, the protection gas is nitrogen ($N_2$). Those with ordinary skills in the art can use other inactive gas for implementation to achieve the same function within the scope of the present invention. In this manner, a pre-determined low value can be achieved by reducing the oxygen concentration in the chamber by mixing the protection gas and the internal gas inside the chamber.

Accordingly, the present invention discloses a protection gas control method and a protection gas control apparatus for a non-sealed process chamber using a gas supply device used for controlling a non-sealed process chamber to prolong the lifetime of the molds and improve the manufacturing yield with lowered protection gas consumption and lowered operation cost. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A protection gas control method for a non-sealed process chamber, comprising steps of:
   (A) activating a protection gas control apparatus while coupling a protection gas to a plurality of throttle valves;
   (B) defining an opening time for each of the throttle valves;
   (C) setting up a first target value and a second target value related to the oxygen concentration in the non-sealed process chamber;
   (D) heating up the non-sealed process chamber;
   (E) determining whether a processing apparatus is in operation and performing step (F) if the processing apparatus is in operation, and otherwise performing step (M);

(F) determining whether an inlet/outlet for the non-sealed process chamber is opened and performing step (G) if the inlet/outlet for the non-sealed process chamber is opened, and otherwise performing step (H);

(G) opening all the throttle valves for a pre-determined period of time and performing step (E);

(H) closing at least one of the throttle valves;

(I) determining whether the oxygen concentration in the non-sealed process chamber is smaller than or equal to the first target value, and performing step (J) if the oxygen concentration in the non-sealed process chamber is smaller than or equal to the first target value, and otherwise performing step (E);

(J) determining whether the oxygen concentration in the non-sealed process chamber is smaller than or equal to the second target value, and performing step (K) if the oxygen concentration in the non-sealed process chamber is smaller than or equal to the second target value, and otherwise performing step (L);

(K) closing at least one of the throttle valves and performing step (E);

(L) keeping the number of throttle valves that are opened and performing step (E); and (M) stopping supplying the protection gas when the temperature of the non-sealed process chamber is lower than a pre-determined temperature.

2. The protection gas control method for a non-sealed process chamber as recited in claim 1, wherein the protection gas is nitrogen.

3. The protection gas control method for a non-sealed process chamber as recited in claim 1, wherein the pre-determined temperature is 80° C.

4. The protection gas control method for a non-sealed process chamber as recited in claim 1, wherein the second target value is smaller than the first target value.

5. The protection gas control method for a non-sealed process chamber as recited in claim 1, wherein the processing apparatus is a high-temperature molding apparatus.

6. The protection gas control method for a non-sealed process chamber as recited in claim 1, wherein the plurality of throttle valves are turned on/off corresponding to a plurality of solenoid valves controlled by a controller.

* * * * *